United States Patent [19]

Goeke et al.

[11]  4,354,009

[45]  Oct. 12, 1982

[54] CATALYST COMPOSITION FOR COPOLYMERIZING ETHYLENE

[75] Inventors: George L. Goeke, Belle Mead; Burkhard E. Wagner, Highland Park; Frederick J. Karol, Belle Mead, all of N.J.

[73] Assignee: Union Carbide Corporation, Danbury, Conn.

[21] Appl. No.: 288,336

[22] Filed: Jul. 30, 1981

[51] Int. Cl.³ ............................ C08F 2/34; C08F 10/02
[52] U.S. Cl. ................................ 526/125; 252/429 B; 252/429 C; 526/348.6; 526/901
[58] Field of Search ................. 252/429 B, 429 C; 526/125

[56] References Cited

U.S. PATENT DOCUMENTS 4,064,334 12/1977 Kuroda et al. ...................... 526/125
4,174,429 11/1979 Giannini et al. .................... 526/125
4,296,223 10/1981 Beyer ................................. 526/125
4,302,566 11/1981 Karol et al. ........................ 526/125

FOREIGN PATENT DOCUMENTS 4651 10/1979 European Pat. Off. .

Primary Examiner—Edward J. Smith
Attorney, Agent, or Firm—John S. Piscitello

[57]  ABSTRACT

The copolymerization of ethylene with other alpha olefins in a low pressure gas phase reaction is improved with the use of a catalyst composition prepared by forming a precursor composition from a magnesium compound, titanium compound and electron donor compound; diluting said precursor composition with an inert carrier material; treating said diluted precursor composition with a hydrocarbyl aluminum dihalide compound; and activating the precursor composition treated in this manner with an organo aluminum compound.

22 Claims, 1 Drawing Figure

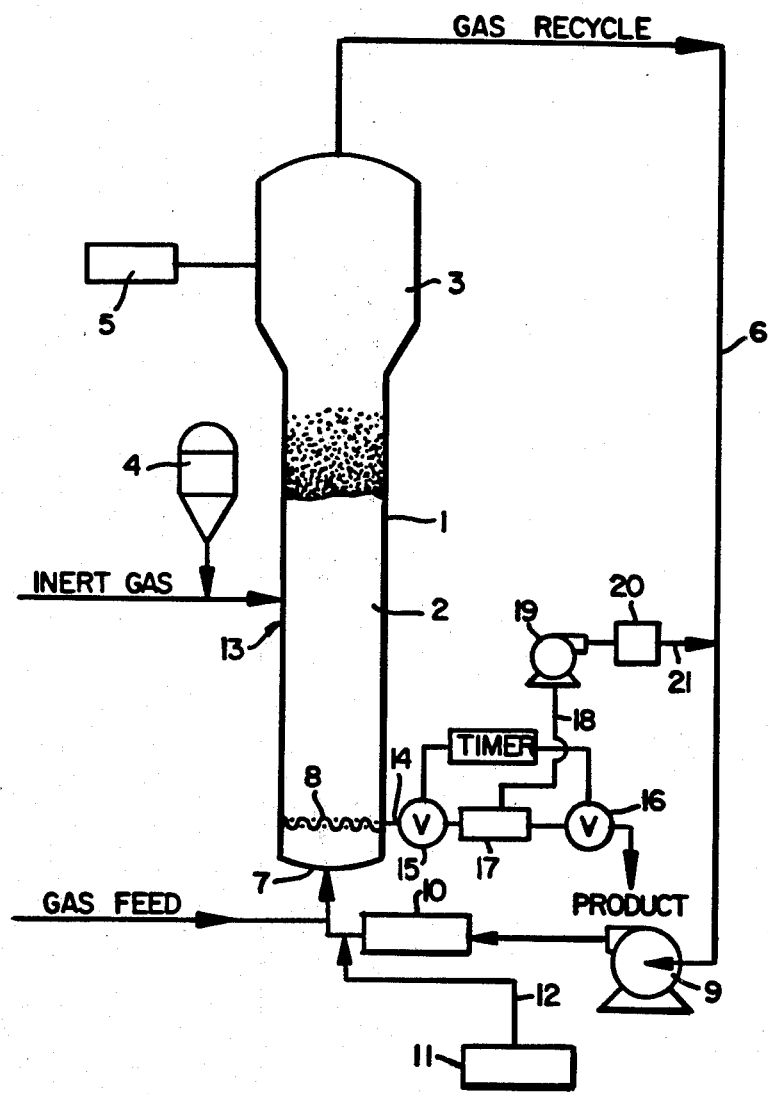

CATALYST COMPOSITION FOR COPOLYMERIZING ETHYLENE

FIELD OF THE INVENTION

This invention relates to an improved process for copolymerizing ethylene. More particularly, this invention relates to an improved low pressure gas phase process for copolymerizing ethylene with other alpha olefins to produce copolymers having a density of from about 0.91 g/cm$^3$ to about 0.96 g/cm$^3$.

BACKGROUND OF THE INVENTION

Ethylene copolymers having a density of from about 0.91 g/cm$^3$ to about 0.96 g/cm$^3$ can be produced, as disclosed in European patent publications Nos. 4645, 4647 and 12148, by continuously copolymerizing ethylene with one or more higher alpha olefin monomers via a low pressure gas phase reaction. In order to obtain copolymers having the desired density in accordance with the process of these references, however, it is necessary for the polymerization mixture to contain a relatively high proportion of the higher alpha olefin monomer(s) vis-a-vis the ethylene monomer. This is especially true when low density copolymers (i.e., no greater than 0.94 g/cm$^3$) are desired, e.g., for film and injection molding applications. However, because these higher comonomers polymerize at a slower rate than ethylene, the high concentration of such comonomers in the reactor causes the polymerization rate to decrease and polymer productivity to decline.

SUMMARY OF THE INVENTION

In accordance with the present invention, it has now been discovered that copolymers of ethylene and higher alpha olefins having a density of from about 0.91 g/cm$^3$ to about 0.96 g.cm$^3$ can be prepared at high polymerization rates and polymer productivity in a low pressure gas phase reaction from comonomer mixtures containing relatively low molar ratios of higher alpha olefin to ethylene if such mixtures are polymerized by means of a catalyst composition prepared by forming a precursor composition from a magnesium compound, titanium compound and electron donor compound; diluting said precursor composition with an inert carrier material; treating said diluted precursor composition with a hydrocarbyl aluminum dihalide compound; and activating the precursor composition treated in this manner with an organo aluminum compound.

BRIEF DESCRIPTION OF THE DRAWING

The drawing shows a gas phase fluid bed reactor system in which the catalyst system of the present invention may be employed.

DESCRIPTION OF THE PREFERRED EMBODIMENT

The catalyst compositions of the present invention can be employed to produce copolymers of a given density from comonomer mixtures containing substantially lower ratios of higher alpha olefin to ethylene than heretofore possible. Alternatively, such catalyst compositions can be employed to polymerize comonomer mixtures containing a given ratio of higher alpha olefin to ethylene to produce copolymers having a lower density than previously possible from such mixtures. In either instance, the desired copolymers are produced in high yield and at a fast rate.

THE ETHYLENE POLYMERS

The ethylene copolymers produced with the catalyst compositions of the present invention have a density of from about 0.91 g/cm$^3$ to about 0.96 g/cm$^3$, preferably from about 0.92 g/cm$^3$ to about 0.95 g/cm$^3$. At a given melt index, the density of the copolymers is primarily regulated by the amount of comonomer which is copolymerized with the ethylene. In the absence of comonomer, ethylene polymerizes to form homopolymers having a density of at least about 0.96 g/cm$^3$. By the addition of progressively larger amounts of comonomer, copolymers having a progressively lower density are obtained. The amount of comonomer needed to achieve the same result will vary from comonomer to comonomer, under the same conditions. Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The copolymers produced with the catalyst compositions of the present invention are copolymers of a major mol percent (at least 90%) of ethylene and a minor mol percent (no more than 10%) of one or more alpha olefins containing from 3 to 8 carbon atoms. These alpha olefins, which should not contain any branching on any of their carbon atoms which is closer than the fourth carbon atom, include propylene, butene-1, pentene-1, hexene-1, 4-methylpentene-1, heptene-1 and octene-1. The preferred alpha olefins are propylene, butene-1, hexene-1, 4-methylpentene-1 and octene-1.

The copolymers produced with the catalyst compositions of the present invention have a standard or normal load melt index of from about 0.1 g/10 minutes to about 100 g/10 minutes, preferably of from about 0.2 g/10 minutes to about 80 g/10 minutes, and a high load melt index (HLMI) of from about 2.2 g/10 minutes to about 2200 g/10 minutes. The melt index of a polymer varies inversely with its molecular weight and is a function of the polymerization temperature of the reaction, the density of the polymer, and the hydrogen/monomer ratio in the reaction system. Thus, the melt index is raised by increasing the polymerization temperature, by decreasing the density of the polymer, and/or by increasing the hydrogen/monomer ratio. In addition to hydrogen, other chain transfer agents may also be used to further increase the melt index of the polymers.

The ethylene copolymers produced with the catalyst compositions of the present invention have a melt flow ratio (MFR) of from about 22 to about 32, preferably of from about 25 to about 30. Melt flow ratio is another means of indicating the molecular weight distribution (Mw/Mn) of a polymer. An MFR in the range of from about 22 to about 32 corresponds to a Mw/Mn of from about 2.7 to about 4.1, and an MFR in the range of from about 25 to about 30 corresponds to a Mw/Mn of from about 2.8 to about 3.6.

The copolymers produced with the catalyst compositions of the present invention have a residual catalyst content, in terms of parts per million of titanium metal, of less than 10 parts per million (ppm) at a productivity level of at least 100,000 pounds of polymer per pound of titanium. The copolymers are readily produced with such catalyst compositions at productivities of up to about 500,000 pounds of polymers per pound of titanium.

The copolymers produced with the catalyst compositions of the present invention are granular materials having an average particle size of the order of from about 0.02 to about 0.05 inches, usually from about 0.02 to about 0.04 inches, in diameter. The particle size is important for the purpose of readily fluidizing the polymer particles in the fluid bed reactor, as described below. These granular materials also have a low level of fines (no greater than 4.0 percent of the total polymer product) and these fines are no greater than 0.005 inches in diameter.

CATALYST PREPARATION: FORMATION OF PRECURSOR

The precursor composition employed in the present invention is formed by dissolving at least one titanium compound and at least one magnesium compound in at least one electron donor compound at a temperature of from about 20° C. up to the boiling point of the electron donor compound. The titanium compound(s) can be added to the electron donor compound(s) before or after the addition of the magnesium compound(s), or concurrent therewith. The dissolution of the titanium compound(s) and the magnesium compound(s) can be facilitated by stirring, and in some instances by refluxing, these two compounds in the electron donor compound. After the titanium compound(s) and the magnesium compound(s) are dissolved, the precursor composition may be isolated by crystallization or by precipitation with an aliphatic or aromatic hydrocarbon containing from 5 to 8 carbon atoms, such as hexane, isopentane or benzene. The crystallized or precipitated precursor composition may be isolated in the form of fine, free-flowing particles having an average particle size of from about 10 microns to about 100 microns after drying at temperatures up to 60° C.

About 0.5 mol to about 56 mols, and preferably about 1 to 10 mols, of the magnesium compound(s) are used per mol of the titanium compound(s) in preparing the catalyst compositions of the present invention.

The titanium compound(s) employed in preparing the precursor composition has the structure $$Ti(OR)_aX_b$$

wherein

R is an aliphatic or aromatic hydrocarbon radical containing from 1 to 14 carbon atoms, or COR' where R' is an aliphatic or aromatic hydrocarbon radical containing from 1 to 14 carbon atoms, X is selected from the group consisting of Cl, Br, I, or mixtures thereof, a is 0, 1 or 2, b is 1 to 4 inclusive and a+b=3 or 4.

Suitable titanium compounds include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound(s) employed in preparing the precursor composition has the structure $$MgX_2$$

wherein X is selected from the group consisting of Cl, Br, I, or mixtures thereof.

Suitable magnesium compounds include $MgCl_2$, $MgBr_2$ and $MgI_2$. Anydrous $MgCl_2$ is particularly preferred.

The electron donor compound(s) employed in preparing the precursor composition is an organic compound which is liquid at 25° C. and in which the titanium and magnesium compounds are soluble. The electron donor compounds are known as such, or as Lewis bases.

Suitable electron donor compounds include the alkyl esters of aliphatic and aromatic carboxylic acids, aliphatic ethers, cyclic ethers and aliphatic ketones. Among these electron donor compounds the preferable ones are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms, preferably from 3 to 4 carbon atoms; cyclic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred of these electron donor compounds include methyl formate, ethyl acetate, butyl acetate, ethyl ether, hexyl ether, tetrahydrofuran, dioxane, acetone and methyl ethyl ketone.

CATALYST PREPARATION: DILUTION OF PRECURSOR WITH SUPPORT

The precursor composition is then diluted with an inert carrier material by (1) mechanically mixing or (2) impregnating such composition into the carrier material.

Mechanical mixing of the inert carrier and precursor composition is effected by blending these materials together using conventional techniques. The blended mixture suitably contains from about 3 percent by weight to about 50 percent by weight of the precursor composition.

Impregnation of the inert carrier material with the precursor composition may be accomplished by dissolving the precursor composition in the electron donor compound, and then admixing the support with the dissolved precursor composition to impregnate the support. The solvent is then removed by drying at temperatures up to about 85° C.

The support may also be impregnated with the precursor composition by adding the support to a solution of the chemical raw materials used to form the precursor composition in the electron donor compound, without isolating the precursor composition from said solution. The excess electron donor compound is then removed by drying at temperatures up to about 85° C.

When thus made as disclosed above the blended or impregnated precursor composition has the formula $$Mg_mTi(OR)_nX_p[ED]_q$$

wherein

R is an aliphatic or aromatic hydrocarbon radical containing from 1 to 14 carbon atoms, or COR' wherein R' is also an aliphatic or aromatic hydrocarbon radical containing from 1 to 14 carbon atoms, X is selected from the group consisting of Cl, Br, I, or mixtures thereof, ED is an electron donor compound, m is 0.5 to 56, preferably 1.5 to 5, n is 0, 1 or 2, p is 2 to 116, preferably 6 to 14, and q is 2 to 85, preferably 3 to 10.

Suitably, the impregnated carrier material contains from about 3 percent by weight to about 50 percent by weight, preferably from about 10 percent by weight to about 30 percent by weight, of the precursor composition.

The carrier materials employed to dilute the precursor composition are solid, particulate porous materials which are inert to the other components of the catalyst composition, and to the other active components of the reaction system. These carrier materials include inorganic materials such as oxides of silicon and/or aluminum. The carrier materials are used in the form of dry powders having an average particle size of from about 10 microns to about 250 microns, preferably from about 20 microns to about 150 microns. These materials are also porous and have a surface area of at least 3 square meters per gram, and preferably at least 50 square meters per gram. Catalyst activity or productivity can apparently be improved by employing a silica support having average pore sizes of at least 80 Angstrom units, and preferably at least 100 Angstrom units. The carrier material should be dry, that is, free of absorbed water. Drying of the carrier material can be effected by heating, e.g., at a temperature of at least 600° C. when silica is employed as the support. Alternatively, when a silica support is employed, it may be dried at a temperature of at least 200° C. and treated with about 1 weight percent to about 8 weight percent of one or more of the aluminum activator compounds described below. Modification of the support by the aluminum compounds in this manner provides the catalyst composition with increased activity and also improves polymer particle morphology of the resulting ethylene polymers. Other organometallic compounds, such as diethylzinc, may also be used to modify the support.

TREATMENT OF PRECURSOR WITH HYDROCARBYL ALUMINUM DIHALIDE COMPOUND(S)

After blending or impregnating the precursor composition into the carrier material, the diluted precursor composition is treated with at least one hydrocarbyl aluminum dihalide compound. Treatment can be effected by dissolving the hydrocarbyl aluminum dihalide compound(s) in an inert liquid solvent and applying the resulting solution to the diluted precursor composition in any convenient manner, e.g., by simply immersing the diluted precursor composition in the solution. The solvent employed must be non-polar, inert to the hydrocarbyl aluminum dihalide compound(s) and all the components of the catalyst, and capable of dissolving the hydrocarbyl aluminum dihalide compound(s) but not the precursor composition. Polar solvents are undesirable because they dissolve and form complexes with the precursor composition as well as with the hydrocarbyl aluminum dihalide compound(s). In order to avoid the formation of such complexes, it is essential to treat the precursor composition with a solution of the hydrocarbyl aluminum dihalide compound(s) in a non-polar solvent as an independent step after formation of the precursor composition in a polar electron donor solvent.

If desired, the diluted precursor composition may be added to the inert liquid solvent to form a slurry before the hydrocarbyl aluminum dihalide compound(s) is dissolved in the solvent. Alternatively, the hydrocarbyl aluminum dihalide compound(s) can be dissolved in a inert liquid solvent before it is added to the slurry or, if desired, directly added to the dry diluted precursor composition.

Among the solvents which can be employed to dissolve the hydrocarbyl aluminum dihalide compound(s) are hydrocarbon solvents, including substituted hydrocarbon solvents, such as isopentane, hexane, heptane, toluene, xylene, naphtha and methylene chloride. Preferably, such solvents are employed together with the hydrocarbyl aluminum dihalide compound(s) in such amounts that the resulting solution contains from about 1 percent by weight to about 25 percent by weight of the hydrocarbyl aluminum dihalide compound(s).

Usually treatment of the diluted precursor composition with the hydrocarbyl aluminum dihalide compound(s) is effected at room temperature. However, if desired, treatment can be effected at a temperature as low as about −30° C. up to the boiling point of the solution. Generally, treatment for periods of from about 1 hour to about 24 hours, usually from about 4 hours to about 10 hours, are sufficient. In any event, the solution employed to treat the precursor composition should contain from about 0.1 mol to about 3.0 mols, preferably about 0.3 mol to about 2.0 mols, of the hydrocarbyl aluminum dihalide compound(s) per mol of electron donor in the precursor composition. The concentration of the solution may be varied as necessary, however, to attain a like molar ratio in the precursor composition after the mixture has been dried.

The hydrocarbyl aluminum dihalide compound(s) employed to treat the precursor composition has the structure

wherein

R is an aliphatic or aromatic hydrocarbon radical containing from 1 to 14 carbon atoms or OR′, wherein R′ is an aliphatic or aromatic hydrocarbon radical containing from 1 to 14 carbon atoms, and X is selected from the group consisting of Cl, Br, I, or mixtures thereof.

Suitable hydrocarbyl aluminum dihalide compounds include $(C_2H_5)AlCl_2$, $(C_2H_5O)AlCl_2$, $(C_6H_5)AlCl_2$, $(C_6H_5O)AlCl_2$, $(C_6H_{13})AlCl_2$, $(C_6H_{13}O)AlCl_2$, and the corresponding bromine and iodine compounds. Ethyl aluminum dichloride is particularly preferred. Aluminum trihalide compounds and dihydrocarbyl aluminum halide compounds are unsuitable as they have not been found to produce catalyst compositions which improve the copolymerization of ethylene with higher alpha olefins to any great extent.

ACTIVATION OF PRECURSOR COMPOSITION

To be useful in producing ethylene copolymers, the precursor composition must be activated with a compound capable of transforming the titanium atoms in the precursor composition to a state which will cause ethylene to effectively copolymerize with higher alpha olefins. By virtue of having been treated with a hydrocarbyl aluminum dihalide compound as hereinabove described, the precursor composition of the present invention is already active to a slight extent. However, both because of the nature and amount of the compound employed in such treatment, such precursor composition is insufficiently active to cause copolymerization of ethylene with higher alpha olefins to proceed to any significant extent. Therefore, it is necessary to further activate the precursor composition before it can be employed in such copolymerization reactions. Because the hydrocarbyl aluminum dihalide compounds employed to modify the precursor composition as described herein do not produce highly active catalysts, they are not employed for this purpose. Rather, other organo aluminum compounds which have been found to produce far more active catalysts are employed.

The organo aluminum compounds that are employed to complete activation of the precursor composition have the structure

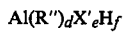

$$Al(R'')_d X'_e H_f$$

wherein

X' is Cl or OR''', R'' and R''' are saturated hydrocarbon radicals containing from 1 to 14 carbon atoms, which radicals may be the same or different, e is 0 to 1.5, f is 0 or 1, and d+e+f=3.

Such compounds can be used individually or in combination thereof. Because of their lower halide content, these compounds are capable of producing far more active catalysts than the hydrocarbyl aluminum dihalide compounds employed to modify the precursor composition as hereinabove described.

Among the organo aluminum compounds suitable for completing activation of the precursor composition are $Al(C_2H_5)_3$, $Al(C_2H_5)_2Cl$, $Al_2(C_2H_5)_3Cl_3$, $Al(C_2H_5)_2H$, $AL(C_2H_5)_2(OC_2H_5)$, $Al(i-C_4H_9)_3$, $Al(i-C_4H_9)_2H$, $Al(C_6H_{13})_3$ and $Al(C_8H_{19})_3$.

Under certain circumstances, it may be desirable to further activate the weakly-active precursor composition before it is introduced into the polymerization reactor. However, because the compounds employed to effect such activation are highly pyrophoric, this procedure has certain disadvantages. The hydrocarbyl aluminum dihalide compounds employed to modify the precursor composition in accordance with the present invention, it is noted, are considerably less pyrophoric than the compounds employed in the activation. Accordingly, it may be desirable, at times, to introduce the precursor composition into the reactor and complete activation entirely therein without any preliminary activation outside the reactor.

Any activation undertaken outside of the polymerization reactor should be partial in nature and limited to the addition of an amount of activator compound which does not raise the molar ratio of activator compound:electron donor in the precursor composition beyond 1.4:1. Preferably, when activation is effected outside the reactor in this manner, the activator compound is employed in an amount which will provide the precursor composition with an activator compound:electron donor molar ratio of from about 0.1:1 to about 0.8:1. Such preliminary partial activation is preferably carried out in a hydrocarbon solvent slurry followed by drying of the resulting mixture, to remove the solvent, at temperatures of from about 20° C. to about 80° C., preferably from about 50° C. to about 70° C. The resulting product is a free-flowing solid particulate material which can be readily fed to the polymerization reactor where the activation is completed with additional activator compound which can be the same or a different compound.

If desired, the preliminary partial activation may be carried out in the same slurry in which the precursor composition is treated with the hydrocarbyl aluminum dihalide compound.

Alternatively, activation of the precursor composition may be completed entirely inside the polymerization reactor without any prior activation outside of the reactor.

The partially activated precursor composition, whether or not further activated outside the polymerization reactor with an organo aluminum activator compound, and the required amount of organo aluminum activator compound necessary to complete activation of the precursor composition are preferably fed to the reactor through separate feed lines. The activator compound may be sprayed into the reactor in the form of a solution thereof in a hydrocarbon solvent such as isopentane, hexane, or mineral oil. This solution usually contains from about 2 to about 30 weight percent of the activator compound. The activator compound is added to the reactor in such amounts as to provide, in the reactor, a total aluminum:titanium molar ratio of from about 10:1 to about 400:1, preferably from about 25:1 to about 60:1.

In a continuous gas phase process, such as the fluid bed process disclosed below, discrete portions of the precursor composition are continuously fed to the reactor with discrete portions of activator compound needed to complete the activation of the precursor composition during the continuing polymerization process in order to replace active catalyst sites that are expended during the course of the reaction.

THE POLYMERIZATION REACTION

The polymerization reaction is conducted by contacting a stream of the monomers, in a gas phase process, such as in the fluid bed process described below, and substantially in the absence of catalyst poisons such as moisture, oxygen, carbon monoxide, carbon dioxide, and acetylene with a catalytically effective amount of the completely activated precursor composition (the catalyst) at a temperature and at a pressure sufficient to initiate the polymerization reaction.

In order to have the desired density of from about 0.91 g/cm$^3$ to about 0.96 g/cm$^3$, the copolymer should contain at least 90 mol percent of ethylene and no more than 10 mol percent of higher alpha olefin. The amount of higher alpha olefin which must be present in the copolymer to attain the desired density will vary from comonomer to comonomer, with a lesser amount being required as the molecular weight of the comonomer increases.

Table I below indicates the molar amount of various comonomers that must be copolymerized with ethylene in order to obtain polymers having a density of from about 0.91 g/cm$^3$ to about 0.96 g/cm$^3$. Also indicated in the table are the molar ratios that should be maintained in the polymerization reactor between each such comonomer and ethylene in order to obtain copolymers having the desired density when employing the catalyst compositions of the present invention. Such ratios are generally from 20 to 30 percent less than those required when employing like catalyst compositions which have not been treated with a hydrocarbyl aluminum dihalide compound as in the present invention.

TABLE I

| Comonomer | Mol Percent In Copolymer | Comonomer/Ethylene Molar Ratio In Polymerization Reactor |
|---|---|---|
| Propylene | >0 to 10.0 | >0 to 0.7 |
| Butene-1 | >0 to 7.0 | >0 to 0.5 |
| Pentene-1 | >0 to 6.0 | >0 to 0.35 |
| Hexene-1 | >0 to 5.0 | >0 to 0.3 |

TABLE I-continued

| Comonomer | Mol Percent In Copolymer | Comonomer/Ethylene Molar Ratio In Polymerization Reactor |
|---|---|---|
| Octene-1 | >0 to 4.5 | >0 to 0.25 |

A fluidized bed reaction system which can be used in the practice of the process of the present invention is illustrated in the drawing. With reference thereto the reactor 1 consists of a reaction zone 2 and a velocity reduction zone 3.

The reaction zone 2 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$, and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identified in nature to the polymer to be formed or different therefrom. When different, they are withdrawn with the desired formed polymer particles as the first product. Eventually, a fluidized bed of the desired polymer particles supplants the start-up bed.

The precursor composition used in the fluidized bed, whether or not subjected to preliminary activation outside of the reactor, is preferably stored for service in a reservoir 4 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possibly free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 5 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned over gas recycle line 6 to the reactor at point 7 below the bed. At that point there is a gas distribution plate 8 above the point of return to aid in fluidizing the bed.

The portion of the gas stream which does not react in the bed constitutes the recycle gas which is removed from the polymerization zone, preferably by passing it into a velocity reduction zone 3 above the bed where entrained particles are given an opportunity to drop back the bed.

The recycle gas is then compressed in a compressor 9 and then passed through a heat exchanger 10 wherein it is stripped of heat of reaction before it is returned to the bed. The temperature of the bed is controlled at an essentially constant temperature under steady state conditions by constantly removing heat of reaction. No noticeable temperature gradient appears to exist within the upper portion of the bed. A temperature gradient will exist in the bottom of the bed in a layer of about 6 to 12 inches, between the temperature of the inlet gas and the temperature of the remainder of the bed. The recycle is then returned to the reactor at its base 7 and to the fluidized bed through distribution plate 8. The compressor 9 can also be placed downstream of the heat exchanger 10.

The distribution plate 8 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization throughout the bed is, therefore, important. The distribution plate 8 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recycle gas through the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

Hydrogen is used as a chain transfer agent in the polymerization reaction of the present invention. The ratio of hydrogen/ethylene employed will vary between 0.1 to about 2.0 moles of hydrogen per mole of the monomer in the gas stream.

Any gas inert to the catalyst and reactants can also be present in the gas stream. The activator compound is preferably added to the reaction system downstream from heat exchanger 10. Thus, the activator compound may be fed into the gas recycle system from dispenser 11 through line 12.

Compounds of the structure $Zn(R_a)(R_b)$, wherein $R_a$ and $R_b$ are the same or different aliphatic or aromatic hydrocarbon radicals containing from 1 to 14 carbon atoms, may be used in conjunction with hydrogen, with the catalysts of the present invention, as molecular weight control or chain transfer agents, that is, to increase the melt index values of the polymers that are produced. From 0 to about 100, and preferably from about 20 to about 30 moles of the zinc compound (as Zn) would be used in the gas stream in the reactor per mol of titanium compound (as Ti) in the reactor. The zinc compound would be introduced into the reactor, preferably in the form of a dilute solution (about 2 to about 30 weight percent) in a hydrocarbon solvent or absorbed on a solid diluent material, such as silica, in amounts of about 50 weight percent. These compositions tend to be pyrophoric. The zinc compound may be added alone, or with any additional portions of the activator compound that are to be added to the reactor, from a feeder, not shown, which could be positioned adjacent to dispenser 11.

It is essential to operate the fluid bed reactor at a temperature below the sintering temperature of the polymer particles to insure that sintering will not occur. To produce the desired copolymers, an operating temperature of from about 30° C. to about 115° C. is preferred, most preferably from about 75° C. to about 95° C. Temperatures of from about 75° C. to about 95° C. are used to prepare copolymers having a density of from about 0.91 g/cm$^3$ to about 0.92 g/cm$^3$, while temperatures of from about 80° C. to about 100° C. are used to prepare copolymers having a density of from about 0.92 g/cm$^3$ to about 0.94 g/cm$^3$, and temperatures of from about 90° C. to about 115° C. are used to prepare copolymers having a density of from about 0.94 g/cm$^3$ to about 0.96 g/cm$^3$.

The fluid bed reactor is operated at pressures of up to about 1000 psi, and is preferably operated at a pressure of from about 100 to about 300 psi, with operation at the higher pressures in such ranges favoring heat transfer since an increase in pressure increases the unit volume heat capacity of the gas.

The precursor composition, whether or not subjected to preliminary activation outside of the reactor, is injected into the bed at a rate equal to its consumption at a point 13 which is above the distribution plate 8. Preferably, the precursor composition is injected at a point in the bed where good mixing of polymer particles occurs. Injecting the precursor composition at a point above the distribution plate is an important feature of this invention. Since the catalyst formed from such precursor composition is highly active, injection of the precursor composition into the area below the distribution plate may cause polymerization to begin there and eventually cause plugging of the distribution plate. Injection into the viable bed, instead, aids in distributing the catalyst through the bed and tends to preclude the formation of localized spots of high catalyst concentration which may result in the formation of "hot spots". Injection of the precursor composition into the reactor above the bed may result in excessive catalyst carryover into the recycle line where polymerization may begin and plugging of the line and heat exchanger may eventually occur.

A gas which is inert to the catalyst, such as nitrogen or argon, is used to carry the precursor composition into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards and downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 14 at or close to the distribution plate 8 and in suspension with a portion of the gas stream which is vented as the particles settle to minimize further polymerization and sintering when the particles reach their ultimate collection zone. The suspending gas may also be used to drive the product of one reactor to another reactor.

The particulate polymer product is conveniently and preferably withdrawn through the sequential operation of a pair of timed valves 15 and 16 defining a segregation zone 17. While valve 16 is closed, valve 15 is opened to emit a plug of gas and product to the zone 17 between it and valve 15 which is then closed. Valve 16 is then opened to deliver the product to an external recovery zone. Valve 16 is then closed to await the next product recovery operation. The vented gas containing unreacted monomers may be recovered from zone 17 through line 18 and recompressed in compressor 19 and returned directly, or through a purifier 20, over line 21 to gas recycle line 6 at a point upstream of the recycle compressor 9.

Finally, the fluidized bed reactor is equipped with an adequate venting system to allow venting the bed during start up and shut down. The reactor does not require the use of stirring means and/or wall scraping means. The recycle gas line 6 and the elements therein (compressor 8, heat exchanger 10) should be smooth surfaced, and devoid of unnecessary obstructions so as not to impede the flow of recycle gas.

The feed stream of gaseous monomers polymerizes to produce copolymer at a space time yield of about 2 to 10 pounds/hour/cubic foot of bed volume.

The following Examples are designed to illustrate the process of the present invention and are not intended as a limitation upon the scope thereof.

The properties of the polymers produced in the Examples were determined by the following test methods:

| | |
|---|---|
| Density | ASTM-1505 procedure is followed for copolymers having a density of less than 0.940 g/cm$^3$, and a modified procedure is used for copolymers having a density of 0.940 g/cm$^3$ or more. For the low density copolymers, a plaque is made and conditioned for one hour at 100° C. to approach equilibrium crystallinity. For the higher density copolymers, the plaque is conditioned for one hour at 120° C. to approach equilibrium crystallinity and is then quickly cooled to room temperature. Measurement for density is then made in a density gradient column and density values are reported as grams/cm$^3$. |
| Melt Index (MI) | ASTM D-1238 - Condition E - Measured at 190° C. - reported as grams per 10 minutes. |
| Flow Index (HLMI) | ASTM D-1238 - Condition F - Measured at 10 times the weight used in the melt index test |

| | |
|---|---|
| Melt Flow Ratio (MFR) = | $\frac{\text{Flow Index}}{\text{Melt Index}}$ above. |
| Productivity | A sample of the resin product is ashed, and the weight % of ash is determined; since the ash is essentially composed of the catalyst, the productivity is thus the pounds of polymer produced per pound of total catalyst consumed. The amount of Ti, Mg, and halide in the ash are determined by elemental analysis. |

EXAMPLE 1

Impregnation of Support With Precursor

In a 12 liter flask equipped with a mechanical stirrer were place 41.8 g (0.439 mol) of anhydrous MgCl$_2$ and 2.5 liter of tetrahydrofuran (THF). To this mixture, 27.7 g (0.146 mol) of TiCl$_4$ were added dropwise over a ½ hour period. The mixture was then heated at 60° C. for another ½ hour in order to completely dissolve the material.

Five hundred grams (500 g) of silica was dehydrated by heating at a temperature of 800° C. and slurried in 3 liters of isopentane. The slurry was stirred while 142 ml. of a 20 percent by weight solution of triethyl aluminum in hexane was added thereto over a ¼ hour period. The resulting mixture was then dried under a nitrogen purge at 60° C. over a period of about 4 hours to provide a dry, free-flowing powder containing 4 percent by weight of the aluminum alkyl.

The treated silica was then added to the solution prepared as above and stirred for ¼ hour. The mixture was dried under a nitrogen purge at 60° C. over a period of about 4 hours to provide a dry, impregnated, free-flowing powder.

EXAMPLE 2

Treatment of Precursor with Ethyl Aluminum Dichloride and Partial Activation with Trialkyl Aluminum (a) Five hundred grams (500 g) of silica-impregnated precursor composition prepared in accordance with Example 1 was slurried in 3 liters of anhydrous isopentane and stirred while a 20 percent by weight solution of ethyl aluminum dichloride in anhydrous hexane was added thereto over a ¼ hour period. The ethyl aluminum dichloride solution was employed in an amount sufficient to provide 1.0 mols of aluminum per mol of tetrahydrofuran in the precursor. Stirring was continued for an additional ¼ to ½ hour while a 20 percent by weight solution of triethyl aluminum in anhydrous hexane was added in an amount that provided a total molar ratio of aluminum to tetrahydrofuran in the mixture of 1.4:1 (including aluminum present from the ethyl aluminum dichloride compound). The mixture was then dried under a nitrogen purge at a temperature of 65°±10° C. over a period of about 4 hours to provide a dry, free-flowing powder. This material was stored under dry nitrogen until it was needed.

(b) The procedure was repeated substituting tri-n-hexyl aluminum for triethyl aluminum. Prior to the addition of the tri-n-hexyl aluminum, ethyl aluminum dichloride was added to the precursor slurry in an amount that provided a 1.8:1 molar ratio of aluminum to tetrahydrofuran. The tri-n-hexyl aluminum was then added in an amount sufficient to bring the total molar ratio of aluminum to tetrahydrofuran to 2.5:1.

(c) The procedure was repeated again using tri-n-hexyl aluminum in place of triethyl aluminum. This time the ethyl aluminum dichloride was added to the precursor slurry in an amount that provided a 1.0:1 molar ratio of aluminum to tetrahydrofuran, while the tri-n-hexyl aluminum was employed in an amount sufficient to bring the total molar ratio of aluminum to tetrahydrofuran to 1.4:1.

(d) The procedure was repeated once again, this time substituting triisobutyl aluminum for triethyl aluminum. In this preparation, the ethyl aluminum dichloride was added to the precursor slurry in an amount that provided a 1.4:1 molar ratio of aluminum to tetrahydrofuran, and the triisobutyl aluminum was employed in an amount sufficient to bring the total molar ratio of aluminum to tetrahydrofuran to 1.7:1.

EXAMPLE 3

Preparation of Partially Activated Precursor Without Prior Treatment with Hydrocarbyl Aluminum Dichloride (a) Five hundred grams (500 g) of silica-impregnated precursor composition prepared in accordance with Example 1 was slurried in 3 liters of anhydrous isopentane and stirred while a 20 percent by weight solution of triethyl aluminum in anhydrous hexane was added thereto over a ¼ hour period. The triethyl aluminum solution was employed in an amount sufficient to provide 0.8 mols of aluminum per mol of tetrahydrofuran in the precursor. After addition of the triethyl aluminum solution was completed, stirring was continued for an additional ¼ hour. The mixture was then dried under a nitrogen purge at a temperature of 65°±10° C. over a period of about 4 hours to provide a dry, free-flowing powder. This material was stored under dry nitrogen until it was needed.

(b) The procedure was repeated substituting tri-n-hexyl aluminum for triethyl aluminum. The tri-n-hexyl aluminum was employed in an amount that provided a molar ratio of aluminum to tetrahydrofuran of 0.6:1.

(c) The procedure was repeated again using tri-n-hexyl aluminum in place of triethyl aluminum. This time the tri-n-hexyl aluminum was employed in an amount that provided a molar ratio of aluminum to tetrahydrofuran of 0.8:1.

EXAMPLES 4–10

Ethylene was copolymerized with butene-1 in a series of seven experiments employing the fluid bed reaction system described and illustrated herein. The polymerization reactor had a lower section 10 feet high and 13½ inches in diameter, and an upper section 16 feet high and 23½ inches in diameter.

Each of the polymerization reactions was conducted for 24 hours at 85° C. under a pressure of 300 psig, a gas velocity of 3 to 6 times $G_{mf}$, and a space-time yield between 3.0 and 6.0. Hydrogen was introduced into the reactor in each instance as a chain transfer agent to control the molecular weight of the copolymers.

In the first three polymerizations (Examples 4 to 6), silica-impregnated precursor composition prepared in accordance with Example 1 and partially activated in accordance with Examples 3(a) to 3(b), respectively, (without prior treatment with hydrocarbyl aluminum dihalide), was fed to the polymerization reactor along with a 5 percent by weight solution of triethyl aluminum in isopentane so as to provide a completely activated catalyst in the reactor having an aluminum:-titanium molar ratio of 30:1 to 50:1.

In the next four polymerizations (Examples 7 to 10), silica-impregnated precursor composition prepared in accordance with Example 1 was treated with ethyl aluminum dichloride and the partially activated in accordance with Examples 2(a) to 2(d), respectively, before it was fed into the polymerization reactor. Activation of the precursor composition was completed as in the first three polymerizations.

Table I below summarizes the manner in which the silica-impregnated precursor composition employed in each example was pretreated before it was introduced into the polymerization reactor, the reaction conditions employed in each polymerization, the properties of the polymers produced by such polymerizations, and the productivity of each catalyst system employed in terms of residual titanium in the copolymer.

As can be seen from the data presented in Table I, by pretreating the catalyst precursor with a hydrocarbyl aluminum dihalide compound, low density copolymers can be obtained from comonomer mixtures containing substantially lower ratios of butene to ethylene than is possible in the absence of such pretreatment.

first polymerization (Example 11), the silica-impregnated precursor composition was partially activated with triisobutyl aluminum employing the procedure disclosed in Example 3 (no prior treatment with hydrocarbyl aluminum dihalide) before it was fed into the reactor. In the next three polymerizations (Examples 12–14), the silica-impregnated precursor composition was treated with ethyl aluminum dichloride and partially activated with triisobutyl aluminum employing the procedure described in Example 2 before it was fed into the reactor.

In each instance, activation of the precursor composition was completed in the reactor by adding a 5 percent by weight solution of triethyl aluminum in isopentane to the reactor to provide a completely activated catalyst in the reactor having an aluminum:titanium molar ratio of 30:1 to 50:1.

Each polymerization was conducted for 24 hours at 85° C. under a pressure of 300 psig., a gas velocity of 3 to 6 times $G_{mf}$, and a space-time yield of about 5.0 to about 5.7. Hydrogen was introduced into the reactor in each instance as a chain transfer agent to control the molecular weight of the copolymers.

Table II below summarizes the manner in which the silica-impregnated precursor composition employed in each example was pretreated before it was introduced into the polymerization reactor, the reaction conditions

TABLE I

| Example | 4 | 5 | 6 | 7 | 8 | 9 | 10 |
|---|---|---|---|---|---|---|---|
| Pretreatment of Precursor | | | | | | | |
| Aluminum Dihalide Compound (RAlCl$_2$) | None | None | None | (C$_2$H$_5$)AlCl$_2$ | (C$_2$H$_5$)AlCl$_2$ | (C$_2$H$_5$)AlCl$_2$ | (C$_2$H$_5$)AlCl$_2$ |
| Mol Ratio RAlCl$_2$:tetrahydrofuran | — | — | — | 1.0 | 1.8 | 1.0 | 1.4 |
| Partial Activator (R$_3$Al) | (C$_2$H$_5$)$_3$Al | (C$_6$H$_{13}$)$_3$Al | (C$_6$H$_{13}$)$_3$Al | (C$_2$H$_5$)$_3$Al | (C$_6$H$_{13}$)$_3$Al | (C$_6$H$_{13}$)$_3$Al | (i-C$_4$H$_9$)$_3$Al |
| Mol Ratio R$_3$Al:tetrahydrofuran | 0.8 | 0.6 | 0.8 | 0.4 | 0.7 | 0.4 | 0.3 |
| Polymerization Conditions | | | | | | | |
| Activator | (C$_2$H$_5$)$_3$Al | (C$_2$H$_5$)$_3$Al | (C$_2$H$_5$)$_3$Al | (C$_2$H$_5$)$_3$Al | (C$_2$H$_5$)$_3$Al | (C$_2$H$_5$)$_3$Al | (C$_2$H$_5$)$_3$Al |
| Temperature °C. | 85 | 85 | 85 | 85 | 85 | 85 | 85 |
| Pressure, psig | 300 | 300 | 300 | 300 | 300 | 300 | 300 |
| Gas Velocity, $G_{mf}$ | 3–6 | 3–6 | 3–6 | 3–6 | 3–6 | 3–6 | 3–6 |
| Space-Time Yield (lbs/hr/ft$^3$) | — | 5.98 | 5.38 | 5.20 | 5.87 | 3.48 | 4.67 |
| Butene/Ethylene Mol Ratio | 0.392 | 0.395 | 0.325 | 0.319 | 0.312 | 0.300 | 0.325 |
| Hydrogen/Ethylene Mol Ratio | 0.155 | 0.236 | 0.236 | 0.220 | 0.431 | 0.400 | 0.297 |
| Polymer Properties | | | | | | | |
| Melt Index, g/10 Min. | 2.1 | 2.4 | 9.4 | 2.3 | 6.2 | 4.6 | 2.2 |
| Melt Flow Ratio | 29 | 28 | 25 | 29 | 27 | 27 | 29 |
| Density, g/cm$^3$ | 0.925 | 0.928 | 0.928 | 0.920 | 0.918 | 0.921 | 0.920 |
| Productivity | | | | | | | |
| ppm Ti in Copolymer | — | 3 | 5 | 2 | 2 | 2 | 3 |

EXAMPLES 11–14

Ethylene was copolymerized with butene-1 in a series of four experiments employing the same fluid bed reaction system employed in Examples 4–10.

The silica-impregnated precursor composition employed in these polymerizations was prepared as disclosed in Example 1 except that the silica used in the preparation was dehydrated solely by heating at 800° C. and without treating it with triethyl aluminum. In the employed in each polymerization, the properties of the polymers produced by such polymerizations, and the productivity of each catalyst system employed in terms of residual titanium in the copolymer.

As is evident from the data presented in Table II, by pretreating the catalyst precursor with a hydrocarbyl aluminum dihalide compound, low density copolymers can be obtained from comonomer mixtures containing substantially lower ratios of butene to ethylene than is possible in the absence of such pretreatment.

TABLE II

| Example | 11 | 12 | 13 | 14 |
|---|---|---|---|---|
| Pretreatment of Precursor | | | | |
| Aluminum Dihalide Compound (RAlCl$_2$) | None | (C$_2$H$_5$)AlCl$_2$ | (C$_2$H$_5$)AlCl$_2$ | (C$_2$H$_5$)AlCl$_2$ |
| Mol Ratio RAlCl$_2$:tetrahydrofuran | — | 0.9 | 1.6 | 1.7 |
| Partial Activator (R$_3$Al) | (i-C$_4$H$_9$)$_3$Al | (i-C$_4$H$_9$)$_3$Al | (i-C$_4$H$_9$)$_3$Al | (i-C$_4$H$_9$)$_3$Al |
| Mol Ratio R$_3$Al:tetrahydrofuran | 0.8 | 0.9 | 0.9 | 0.3 |
| Polymerization Conditions | | | | |
| Activator | (C$_2$H$_5$)$_3$Al | (C$_2$H$_5$)$_3$Al | (C$_2$H$_5$)$_3$Al | (C$_2$H$_5$)$_3$Al |

TABLE II-continued

| Example | 11 | 12 | 13 | 14 |
|---|---|---|---|---|
| Temperature, °C. | 85 | 85 | 85 | 85 |
| Pressure, psig | 300 | 300 | 300 | 300 |
| Gas Velocity, $G_{mf}$ | 3–6 | 3–6 | 3–6 | 3–6 |
| Space-Time Yield (lbs/hr/ft$^3$) | — | 5.10 | 5.71 | 5.16 |
| Butene/Ethylene Mol Ratio | 0.402 | 0.370 | 0.326 | 0.325 |
| Hydrogen/Ethylene Mol Ratio | 0.152 | 0.268 | 0.298 | 0.276 |
| Polymer Properties | | | | |
| Melt Index, g/10 Min. | 1.8 | 1.6 | 2.0 | 2.0 |
| Melt Flow Ratio | 28 | 27 | 27 | 26 |
| Density, g/cm$^3$ | 0.925 | 0.920 | 0.925 | 0.925 |
| Productivity | | | | |
| ppm Ti in Copolymer | — | 5 | 4 | 3 |

What is claimed is:

1. A continuous process for producing ethylene copolymers containing at least 90 mol percent of ethylene and no more than 10 mol percent of one or more alpha olefins containing from 3 to 8 carbon atoms, said copolymers being produced in granular form and having a density of from 0.91 g/cm$^3$ to 0.96 g/cm$^3$, which comprises contacting a mixture of ethylene and at least one alpha olefin containing from 3 to 8 carbon atoms, at a temperature of from 30° C. to 115° C. and a pressure no greater than 1000 psi, in a gas phase reaction zone, with particles of a catalyst system comprising a precursor composition having the formula $$Mg_mTi(OR)_nX_p[ED]_q$$

wherein

R is an aliphatic or aromatic hydrocarbon radical containing from 1 to 14 carbon atoms, or COR' wherein R' is an aliphatic or aromatic hydrocarbon radical containing from 1 to 14 carbon atoms, X is selected from the group consisting of Cl, Br, I, and mixtures thereof, ED is an organic electron donor compound selected from the group consisting of alkyl esters of aliphatic and aromatic carboxylic acids, aliphatic ethers, cyclic ethers and aliphatic ketones, m is 0.5 to 56, n is 0, 1 or 2, p is 2 to 116, and q is 2 to 85, said precursor composition being diluted with an inert carrier material and treated with from 0.1 mol to 3.0 mols of a hydrocarbyl aluminum dihalide compound per mol of electron donor in said precursor composition, said hydrocarbyl aluminum dihalide compound having the formula $$RAlX_2$$

wherein

R is an aliphatic or aromatic hydrocarbon radical containing from 1 to 14 carbon atoms or OR', wherein R' is an aliphatic or aromatic hydrocarbon radical containing from 1 to 14 carbon atoms, and X is selected from the group consisting of Cl, Br, I, and mixtures thereof, and said precursor composition being completely activated with from 10 mols to 400 mols of activator compound per mol of such precursor composition, said activator compound having the formula $$Al(R'')_dX'_eH_f$$

wherein X' is Cl or OR''', R'' and R''' are saturated hydrocarbon radicals containing from 1 to 14 carbon atoms, e is 0 to 1.5, f is 0 or 1, and d+e+f=3.

2. A process as in claim 1 wherein said precursor composition is mechanically mixed with the inert carrier material and the blended mixture contains from 3 percent by weight to 50 percent by weight of the precursor composition.

3. A process as in claim 1 wherein the inert carrier material is impregnated with the precursor composition and the impregnated carrier material contains from 3 percent by weight to 50 percent by weight of the precursor composition.

4. A process as in claim 1, 2 or 3 wherein the inert carrier material is silica.

5. A process as in claim 4 wherein X is Cl, [ED] is tetrahydrofuran, n is 0, m is 1.5 to 5, p is 6 to 14, and q is 3 to 10.

6. A process as in claim 5 wherein the hydrocarbyl aluminum dihalide compound is ethyl aluminum dichloride.

7. A precursor composition suitable as a component of a catalyst composition capable of copolymerizing ethylene with higher alpha olefins under a pressure of less than 1000 psi, said precursor composition having the formula $$Mg_mTi(OR)_nX_p[ED]_q$$

wherein

R is an aliphatic or aromatic hydrocarbon radical containing from 1 to 14 carbon atoms, or COR' wherein R' is an aliphatic or aromatic hydrocarbon radical containing from 1 to 14 carbon atoms, X is selected from the group consisting of Cl, Br, I, and mixtures thereof, ED is an organic electron donor compound selected from the group consisting of alkyl esters of aliphatic and aromatic carboxylic acids, aliphatic ethers, cyclic ethers and aliphatic ketones, m is 0.5 to 56, n is 0, 1 or 2, p is 2 to 116, and q is 2 to 85, said precursor composition being diluted with an inert carrier material and treated with from 0.1 mol to 3.0 mols of hydrocarbyl aluminum dihalide compound per mol of electron donor compound in said precursor composition, said hydrocarbyl aluminum dihalide compound having the formula $$RAlX_2$$

wherein

R is an aliphatic or aromatic hydrocarbon radical containing from 1 to 14 carbon atoms or OR', wherein R' is an aliphatic or aromatic hydrocarbon radical containing from 1 to 14 carbon atoms, and X is selected from the group consisting of Cl, Br, I, and mixtures thereon.

8. A precursor composition as in claim 7 wherein said precursor composition is mechanically mixed with the inert carrier material and the blended mixture contains from 3 percent by weight to 50 percent by weight of the precursor composition.

9. A precursor composition as in claim 7 wherein the inert carrier material is impregnated with the precursor composition and the impregnated carrier material contains from 3 percent by weight to 50 percent by weight of the precursor composition.

10. A precursor composition as in claim 7, 8 or 9 wherein the inert carrier material is silica.

11. A precursor composition as in claim 10 wherein X is Cl, [ED] is tetrahydrofuran, n is 0, m is 1.5 to 5, p is 6 to 14, and q is 3 to 10.

12. A precursor composition as in claim 11 wherein the hydrocarbyl aluminum dihalide is ethyl aluminum dichloride.

13. A composition as in claim 7, 8 or 9 which has been partially activated with an organo aluminum activator compound so as to provide a molar ratio of activator compound:electron donor compound in the precursor composition of up to 1.4:1, said activator compound having the formula $$Al(R'')_d X'_e H_f$$

wherein X' is Cl or OR''', R'' and R''' are saturated hydrocarbon radicals containing from 1 to 14 carbon atoms, e is 0 to 1.5, f is 0 or 1, and d+e+f=3.

14. A composition as in claim 13 wherein the inert carrier material is silica.

15. A composition as in claim 14 wherein X is Cl, [ED] is tetrahydrofuran, n is 0, m is 1.5 to 5, p is 6 to 14, and q is 3 to 10.

16. A composition as in claim 15 wherein the hydrocarbyl aluminum dihalide compound is ethyl aluminum dichloride.

17. A process for preparing a treated precursor composition suitable as a component of a catalyst composition capable of copolymerizing ethylene with higher alpha olefins under a pressure of less than 1000 psi which comprises (A) forming a precursor composition of the formula $$Mg_m Ti(OR)_n X_p [ED]_q$$

wherein

R is an aliphatic or aromatic hydrocarbon radical containing from 1 to 14 carbon atoms, or COR' wherein R' is an aliphatic or aromatic hydrocarbon radical containing from 1 to 14 carbon atoms, X is selected from the group consisting of Cl, Br, I, and mixtures thereof, ED is an organic electron donor compound selected from the group consisting of alkyl esters of aliphatic and aromatic carboxylic acids, aliphatic ethers, cyclic ethers and aliphatic ketones, m is 0.5 to 56, n is 0, 1 or 2, p is 2 to 116, and q is 2 to 85, by dissolving a titanium compound and a magnesium compound in a liquid organic electron donor compound so as to form a solution of said precursor composition in said electron donor compound, said magnesium compound having the structure $MgX_2$, said titanium compound having the structure $Ti(OR)_a X_b$ wherein a is 0, 1 or 2, b is 1 to 4 inclusive and a+b=3 or 4, said magnesium compound, said titanium compound, and said electron donor compound being employed in such amounts as to satisfy the values of m, n, p and q, (B) diluting said precursor composition with an inert carrier material, and (C) treating the diluted precursor composition with from 0.1 mol to 3.0 mols of a hydrocarbyl aluminum dihalide compound per mol of electron donor in the precursor compound, said hydrocarbyl aluminum dihalide compound having the formula $$RAlX_2$$

wherein

R is an aliphatic or aromatic hydrocarbon radical containing from 1 to 14 carbon atoms or OR', wherein R' is an aliphatic or aromatic hydrocarbon radical containing from 1 to 14 carbon atoms, and X is selected from the group consisting of Cl, Br, I, and mixtures thereof.

18. A process as in claim 17 wherein said precursor composition is mechanically mixed with the inert carrier material to form a blended mixture containing from 3 percent by weight to 50 percent by weight of the precursor composition.

19. A process as in claim 17 wherein the inert carrier material is impregnated with the precursor composition and the impregnated carrier material contains from 3 percent by weight to 50 percent by weight of the precursor composition.

20. A process as in claims 7, 18 or 19 wherein the inert carrier material is silica.

21. A process as in claim 20 wherein X is Cl, [ED] is tetrahydrofuran, n is 0, m is 1.5 to 5, p is 6 to 14, and q is 3 to 10.

22. A process as in claim 21 wherein the hydrocarbyl aluminum dihalide is ethyl aluminum dichloride.

* * * * *

UNITED STATES PATENT AND TRADEMARK OFFICE
CERTIFICATE OF CORRECTION

PATENT NO. : 4,354,009
DATED : October 12, 1982
INVENTOR(S) : George Leonard Goeke et al.

It is certified that error appears in the above—identified patent and that said Letters Patent is hereby corrected as shown below:

Column 1, line 38, "0.96 g.cm$^3$" should read -- 0.96 g/cm$^3$ --.

Column 5, line 65, "a" should read -- an --.

Column 12, line 35, "8" should read -- 9 --.

Column 14, line 67, "3(b)" should read -- 3(c) --.

Column 15, line 9, "the" should be deleted.

Column 15, line 14, "Table I" should read -- Table II --.

Column 15, line 22, "Table I" should read -- Table II --.

Column 16, line 24, "Table II" should read -- Table III --.

Column 16, line 54, "Table II" should read -- Table III --.

Columns 15-16, line 28 "Table I" should read -- Table II --.

Columns 15-16, line 60, "Table II" should read -- Table III --.

UNITED STATES PATENT AND TRADEMARK OFFICE
CERTIFICATE OF CORRECTION

PATENT NO. : 4,354,009                      Page 2 of 2

DATED : October 12, 1982

INVENTOR(S) : George Leonard Goeke et al.

It is certified that error appears in the above—identified patent and that said Letters Patent is hereby corrected as shown below:

Columns 17-18, line 1, "Table II" should read - - Table III - -.

Column 20, line 55, "7" should read - - 17 - -.

Signed and Sealed this

Fourth Day of October 1983

[SEAL]

Attest:

GERALD J. MOSSINGHOFF

Attesting Officer        Commissioner of Patents and Trademarks